United States Patent [19]
Whittlesey

[11] Patent Number: 5,755,022
[45] Date of Patent: May 26, 1998

[54] MECHANISM FOR FEEDING A STRING LOOP INTO A CLIP ATTACHMENT APPARATUS

[75] Inventor: Thomas E. Whittlesey, Apex, N.C.

[73] Assignee: Delaware Capital Formation, Inc., Wilmington, Del.

[21] Appl. No.: 557,435

[22] Filed: Nov. 14, 1995

[51] Int. Cl.⁶ .................. B23P 21/00; B23Q 7/10
[52] U.S. Cl. .............. 29/788; 29/818; 29/243.56; 53/138.4; 53/139.4; 452/48
[58] Field of Search .................. 29/771, 773, 779, 29/788, 809, 818, 243.56, 243.57; 53/138.4, 134.1, 139.4, 138.2; 452/46, 48, 51

[56] References Cited

U.S. PATENT DOCUMENTS

| D. 252,800 | 9/1979 | Ernst . | |
|---|---|---|---|
| 2,842,919 | 7/1958 | Tipper . | |
| 4,165,593 | 8/1979 | Niedecker | 53/138.4 |
| 4,203,335 | 5/1980 | Coffey . | |
| 4,533,164 | 8/1985 | Barroso | 452/48 |
| 4,612,684 | 9/1986 | Kollross | 452/51 |
| 4,694,537 | 9/1987 | Kollross | 53/134.1 |
| 4,720,010 | 1/1988 | Bertram | 206/345 |
| 5,067,313 | 11/1991 | Evans | 53/138.4 |
| 5,077,955 | 1/1992 | Evans | 53/138.4 |
| 5,100,364 | 3/1992 | Kollross et al. | 452/51 |
| 5,109,648 | 5/1992 | Evans | 53/138.2 |
| 5,203,759 | 4/1993 | Torres et al. | 53/138.4 |
| 5,238,444 | 8/1993 | Schwimmer et al. . | |
| 5,269,054 | 12/1993 | Poteat et al. | 29/243.56 |
| 5,269,116 | 12/1993 | Roberts et al. | 53/138.4 |

Primary Examiner—David P. Bryant
Attorney, Agent, or Firm—Banner & Witcoff, Ltd.

[57] ABSTRACT

A clip attachment mechanism includes therewith a two-stage mechanism for feeding a cord loop sequentially and singly into the pathway of a u-shaped metal clip moving down a channel in the clipper for attachment about casing material. The two-stage operation includes a mechanism for removing loops, one at a time, from a tape having a plurality of loops mounted thereon. The loop removed from the tape is positioned through a series of shutters. It is then transported by a second transport mechanism along a defined pathway and the tie end of the loop is inserted into a window to the clip channel of the clipper.

4 Claims, 7 Drawing Sheets

MECHANISM FOR FEEDING A STRING LOOP INTO A CLIP ATTACHMENT APPARATUS

BACKGROUND OF THE INVENTION

This invention relates to a mechanism for feeding a loop or tie into a clip attachment apparatus.

Heretofore there have been numerous patents which disclose clip attachment apparatus; that is apparatus used for the attachment of a U-shaped metal clip, having a crown and depending legs, about gathered material, such as sausage casing. Examples include U.S. Pat. Nos. 5,077,955 and 5,269,054 incorporated herewith by reference.

Often, it is desirable to insert a loop or tie under the crown of the clip so that the loop or tie and clip may be simultaneously attached to the gathered sausage casing material. Thereby the loop or tie may be attached to the casing and utilized to support or hang the filled sausage casing on a rack or hook for further processing, for example smoking, cooking or the like. Various types of loops or ties have been proposed including those identified in U.S. Pat. No. D257,800 and 4,720,010 incorporated herewith by reference. The ties of U.S. Pat. No. 4,720,010 constitute a knotted string or cord of the general type to which the present invention is directed.

It is also desirable to automate the entire operation of positioning a loop or tie of the type disclosed in U.S. Pat. No. 4,720,010 in the pathway of a U-shaped metal clip prior to application of the clip about gathered casing material. To facilitate such loop or tie positioning, a collection of ties is typically mounted on a continuous, flexible tape with one end of the loop or tie affixed to the tape and the loop or ties arranged in line, overlapping one another. U.S. Pat. No. 4,720,010 discloses such a tape having ties mounted thereon, said patent being incorporated herewith by reference.

Feeding of loops or ties into the pathway of the U-shaped metal clip during a clipping operation is also desired. U.S. Pat. No. 5,269,116 depicts one methodology for such a feeding operation and a mechanism for accomplishing such an operation. Said patent is also incorporated herewith by reference. U.S. Pat. No. 5,203,759, also incorporated herewith, discloses another feeding mechanism for feeding knotted loops or ties into a clipper. Finally, U.S. Pat. No. 5,067,313, incorporated herewith, discloses a mechanism for feeding of loops into a clipper apparatus.

Despite the progress in the packaging of meat and other products by means of filling of a casing and closure of the ends of the casing by means of U-shaped metal clips including the attachment of loops or ties thereto, there has remained a need for an improved mechanism for feeding loops into the clipper mechanism. One desired characteristic for such an improved feeding operation is to provide that the tied end of the loop, which typically has a knot thereon and thus has a diameter which is increased relative to the cord forming the loop, be positioned under the clip in a fashion which will enhance attachment of the loop to the casing by the clip when the loop is hung on a rack. That is, the loop end of the loop will be positioned on one side of the clip in order to enable that loop end to be attached to a hook. The tie end of the loop will be positioned on the opposite side of the clip and, thus, resist removal of the loop from the clip and gathered sausage casing when the loop end is pulled.

SUMMARY OF THE INVENTION

Briefly, the present invention comprises a mechanism as well as a method for feeding flexible cord or string loops into the pathway of a U-shaped metal clip as the clip is driven down a channel by a punch against an anvil to thereby be formed about gathered casing material. By positioning the loop within the pathway of the U-shaped metal clip, the loop is affixed and held by the formed clip with the gathered casing material.

The loop positioning mechanism of the invention is devised to be incorporated with a typical clip attachment apparatus of the type including a punch which drives a clip down a channel in a block or frame so that the clip is driven against an anvil at the end of the channel and formed about gathered casing. Typically, gates are provided for gathering the casing and for defining, at least in part, the channel down which the clip is driven before the clip is attached to the casing. The block or frame for the channel includes a window leading into the channel into which clips feed one at a time by means of a clip feeding mechanism. Downstream from the clip feeding window into the channel is a second window to the channel which is adapted to receive the knotted end of a loop so that when the clip proceeds downwardly through the channel, the loop is engaged by the crown of the clip with the legs extending on each side of the loop. The loop is thereby drawn downward by the movement of the clip and is compressed against the gathered casing material as the clip is formed around that casing material by the anvil.

The loop positioning mechanism is adapted for utilization with a series for loops mounted on a tape wherein the loops each include a loop end and a tie end. The tape is drawn from a storage roll and passes over rollers which guide the tape in a manner which causes the loop end of loops on the tape to be extended from the tape and exposed one at a time. A pusher bar then engages the exposed loop end. A reciprocating loop transfer arm next moves to engage the exposed loop, transporting the exposed loop by arcuate movement to a second station. At the second station, the loop end of the loop is fitted through a series of shutters or slots. When the loop transfer arm has effectively transported the loop from the tape into the slots or shutters, a gripping arm on an endless belt is actuated. The gripping arm is thereby moved to engage the knotted end of the loop and transport that knotted end along a guide plate into the loop window. Thus, movement of the belt causes the gripping arm to project the knotted end of the loop through the loop window into the channel pathway for a clip. A shutter then closes against the loop to hold it in position in the clip channel. The reciprocating belt next moves back to its initial position ready to transport yet another loop. The clipper mechanism is then actuated and moves to transport a clip against the loop and subsequently to be formed about the gathered material and the loop.

Thus, it is the object of the invention to provide an improved clip attachment mechanism which incorporates a loop feed mechanism for use in conjunction with the clip attachment mechanism.

It is a further object of the invention to provide a loop feed mechanism which transports loops singly from a storage tape into a loop feed window in the pathway of a U-shaped metal clip of the clip attachment mechanism.

Yet another object of the invention is to provide an economical and reliable mechanism for feeding a flexible loop or tie into a clipper in a specified orientation.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
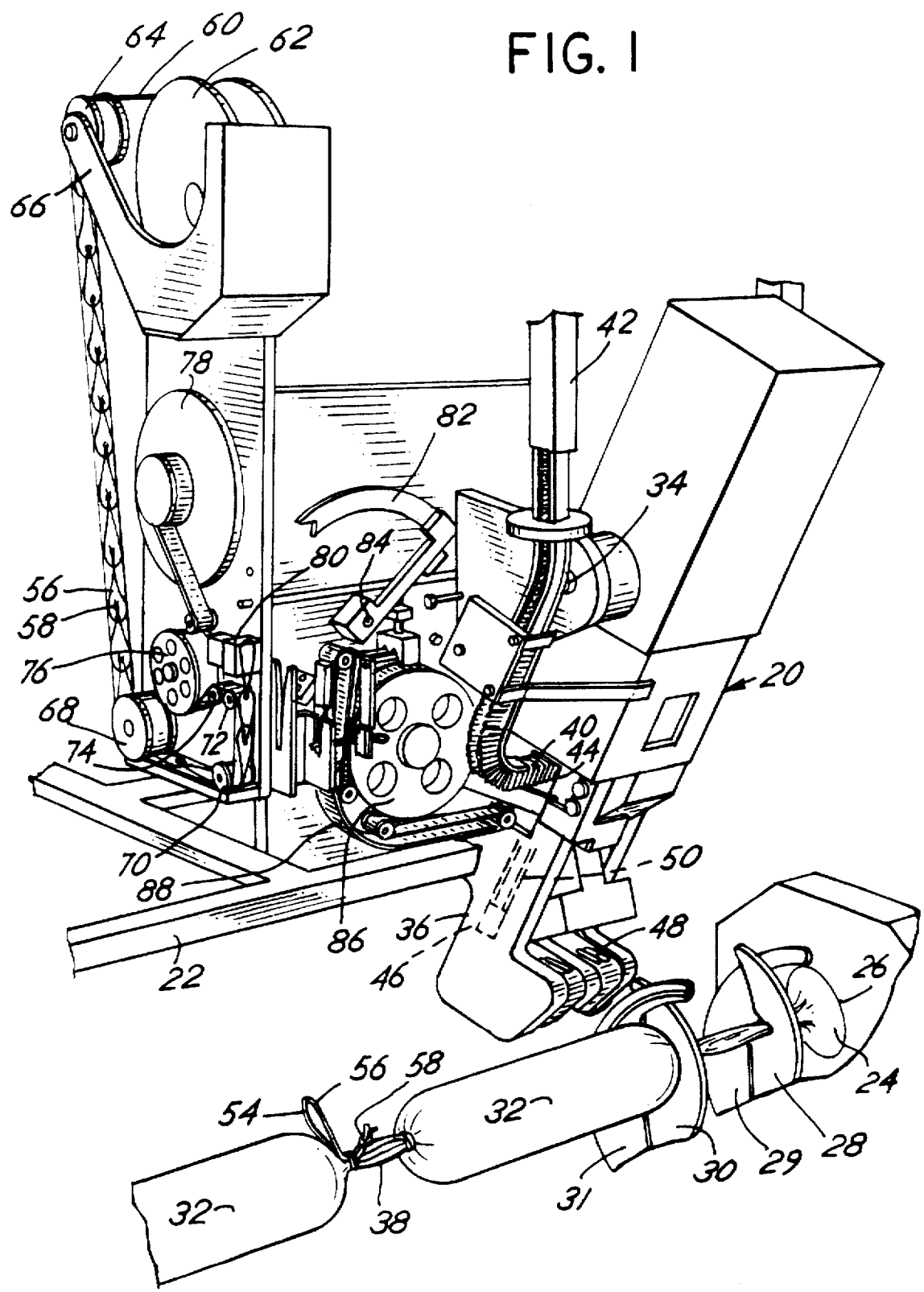
FIG. 1 is an isometric view of the loop feed mechanism in combination with a clipper designed to attach clips about sausage casing.

Referring first to FIG. 1, there is illustrated the overall assembly of a clip attachment apparatus including the improved loop feeding mechanism of the present invention. FIG. 1 also depicts the method of operation of the loop feeding mechanism. Thus, a clipper 20 is mounted on a mounting bracket 22. The clipper 20 is a double clipper since it simultaneously applies two clips in parallel to gathered sausage casing material. In operation, sausage casing material 24 is filled, e.g., with sausage or some other product extruded through a discharge horn 26. The filled casing 24 moves between spaced gathering plates 28, 29, 30 and 31. The plates 28 and 29 as well as plates 30 and 31 are initially separated from one another on opposite sides of the filled casing 24. After the filled casing 24 passes through the space between plates 28, 29, 30, and 31, the plates 28, 29, 30 and 31 close to gather or constrict the casing 24 and define the ends of a chub 32. Plates 28, 29, 30, and 31 are also initially in close proximity to one another, and in operation, plates 30 and 31 will close or gather casing simultaneously with plates 28, 29 and then plates 30, 31 will move downstream or in the direction of the arrow in FIG. 1 so as to expose a length of gathered material between plates 28, 29 and plates 30, 31 by effectively transporting the chub 32 downstream and pulling casing 24 from horn 26. Thereafter, the clipper mechanism 20 will pivot about a pivot pin 34 to position the clip attachment mechanism and, more particularly, the clipper frame members 36 adjacent to and over the gathered casing tail or length 38 between the plates 28, 29 and 30, 31.

Clips 40 feed from a source (not shown) along a clip guide mechanism 42 and into a window 44 in the frame 36 of the clipper 20. A clip 40 is thus positioned in a channel 45 one at a time as depicted in phantom in FIG. 1.

In the embodiment shown, two clips 40 are fed simultaneously into parallel channels for simultaneous attachment at spaced positions on the casing 24. One clip 40 receives a loop (as described below) for attachment at one end of chub 32, though a loop feed mechanism may be used for each clip 40 if desired. In such an event, a loop feed mechanism would be provided on each side of the clipper and associated with each clip feeding mechanism. In any event, a clip 40 is driven by a punch in the channel 45 toward an anvil 48 to form each clip 40 about gathered material 38. Clips 40 are thus driven by a punch 50. The punch 50 rides in the channel 46.

The invention relates more particularly to a mechanism and method for feeding a tie loop 54 into a second or loop window 52 in frame member 36. Window 52 is downstream from the clip window 44 in the direction of travel of punch 50 and window 52 provides access to the clip channel 45. As depicted in FIG. 1, it is desired to have a loop 54 attached at least to one end of a completed sausage chub 32. The loop 54, thus, includes a loop end 56 and a tie end 58. A clip 40, which is formed about the gathered casing 38, engages and holds the loop 54 tightly against the gathered casing 38. The tie end 58 is on the opposite side of the clip 40 from the loop end 56. In this way, the loop end 56 may be attached to or supported on a hook of a rack, and the tie end 58 will engage against the clip 40 and not be pulled from the sausage chub 32 during any subsequent smoking, cooking or other operation involving the formed sausage chub 32. Typically the gathered casing 38 is severed after attachment of the clips 40 and loop 54 so that the separate chubs 32 will be separately hung on racks; although, there are instances when a series of chubs 32 may remain connected for at least a period of time after the clipping operation and may be supported on a rack for smoking, etc. The chubs 32 may then later be separated.

The mechanism for feeding the loops 54 is depicted in the remainder of FIG. 1 and in greater detail in the remaining figures. The loops 54 are retained on a flexible tape 60. A series of loops 54 overlap one another with the tie end 58 being generally removably affixed to tape 60, and the loop ends of 56 of consecutive loops 54 overlying the tie ends 58. The tape 60 is typically retained on a reel 62 and discharged from that reel 62 over an idler roller 64 mounted on a support bracket or support arm 66 attached to the overall mounting bracket 22. The loop 54 then passes over a second idler roller 68, a third idler roller 70, a pair of guide rollers 72 and 74 and then to a drive roller 76. Typically the tape 60 includes perforations 77, and the drive roller 76 includes matching projecting sprocket teeth 79 which engage the perforations 77 so that as the drive roller 76 is intermittently driven it will advance the tape 60. A take up reel 78 is provided to gather the tape 60 from which the loops 54 have been removed. Note, a tape brake 71 is provided in the pathway of tape 60 between reels 68 and 70. The brake 71 includes a foot 73 which rotates into the pathway of the tape 60 and maintains the tape 60 in a non-movable position as the subsequent steps in the transfer of a loop 54 take place as described below. The tape 60 is thus held against a bar 75 by foot 73 when a loop 54 is removed from the tape 60. The tape 60 is thus taut upon removal of loop 54.

A plunger mechanism 80, described in more detail below, is positioned to engage the loop end 56 of loops 54 and move the loop end 56 into engagement by a loop transfer arm 82. The loop transfer arm 82 is mounted on a shaft 84 for reciprocal, arcuate movement between the rest or first position depicted in FIG. 1 and a position wherein it engages the loop end 56 and transports the loop end 56 into position for a second transfer operation effected by means of an endless reciprocating belt. The loop 54 is thus transferred to a station (described below) whereby a drive wheel 86 may operate to move an endless belt 88 with a transport arm 90 to thereby transport the tie end 58 of the loop 54 into the window 52. Reference to the remaining figures depicts this construction in greater detail.

Figure 2:
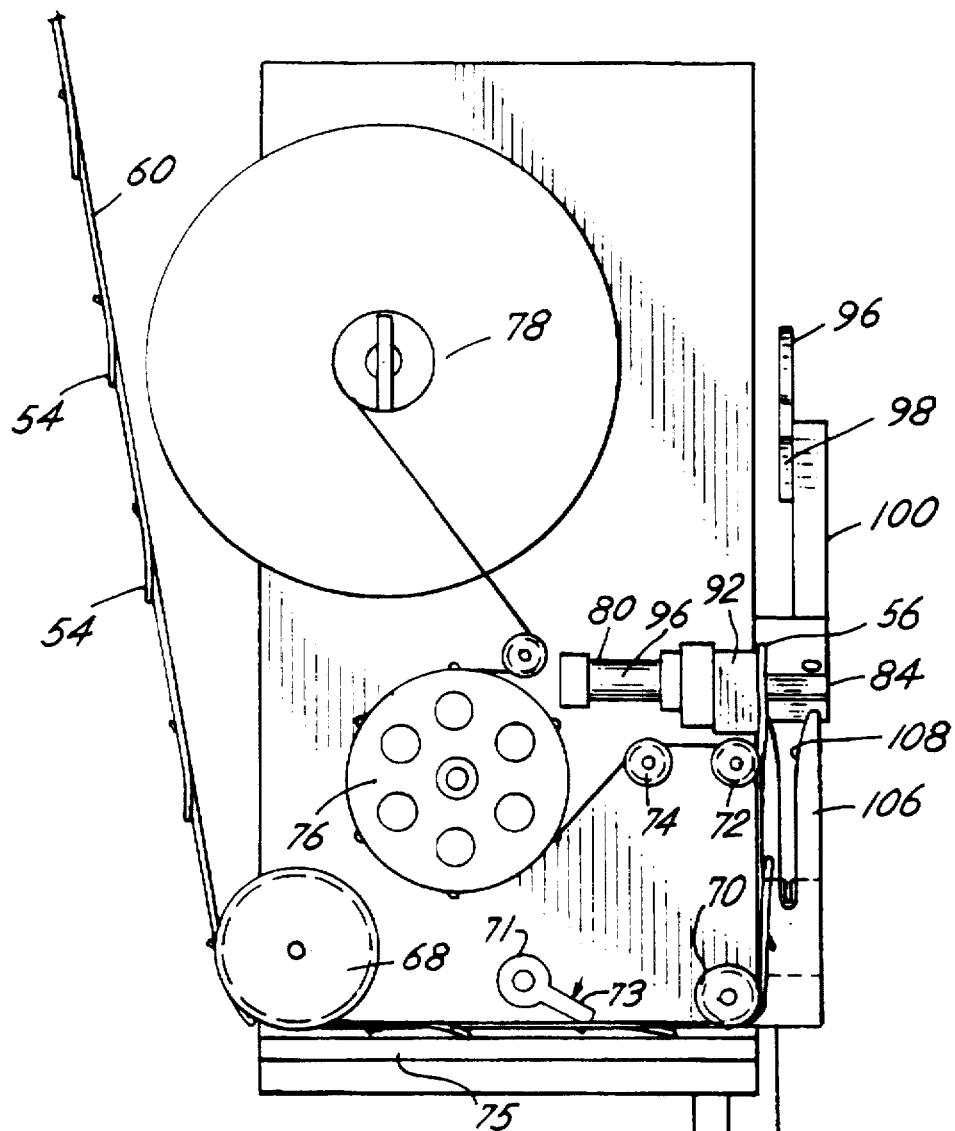
FIG. 2 is a front elevation of the tape feed mechanism for feeding the tape of loops viewed in the direction of the arrow, 2, in FIG. 1.
Figure 3:
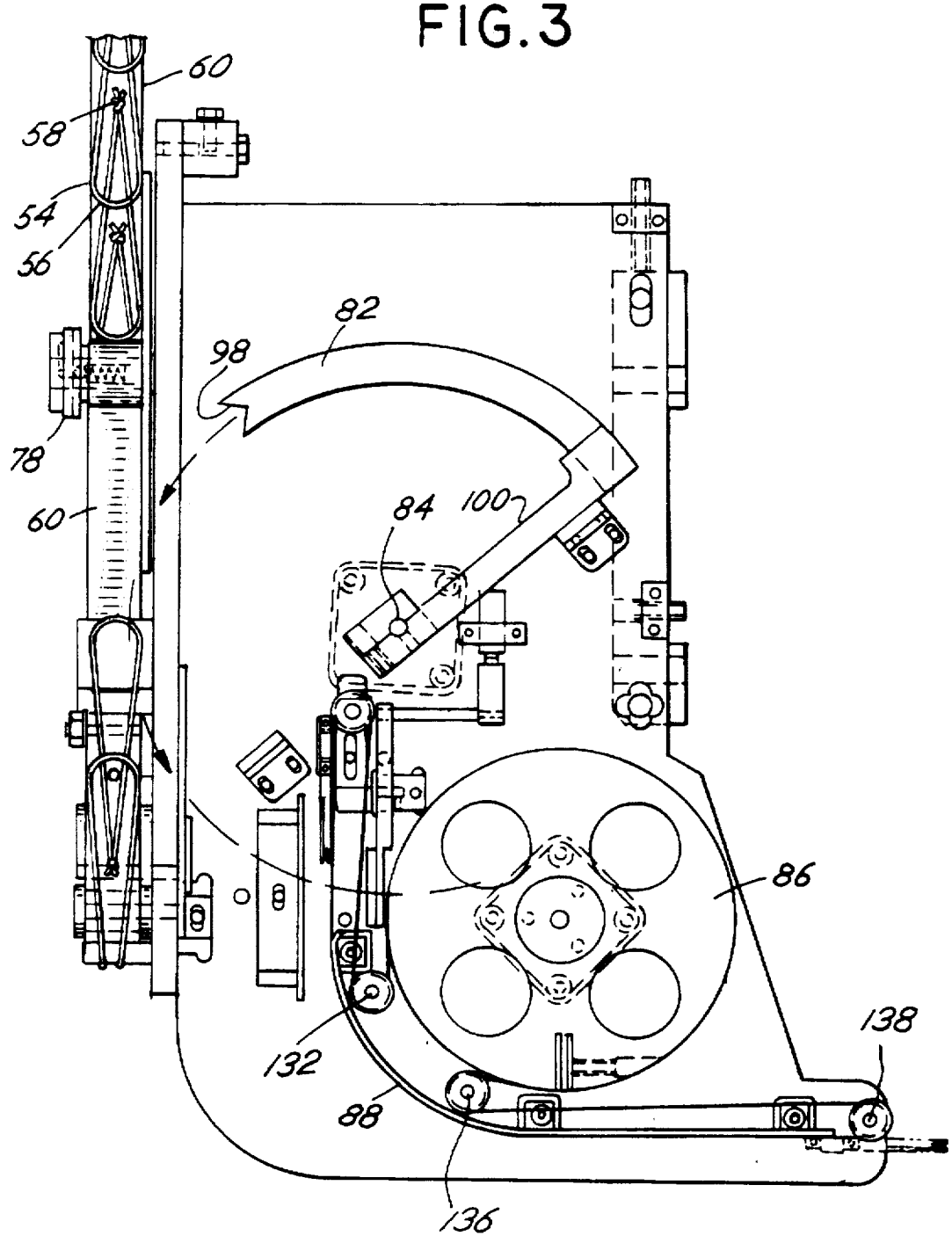
FIG. 3 is a front elevation of the reciprocating arm and belt drive for transporting a loop from the tape into the loop feed window of the clipper.

Referring to FIG. 2, there is depicted the tape 60 having a plurality of loops 54 arranged thereon. Rollers 68, 70 and 72 guide the tape 60. The tape 60 then moves over the roller 74 and then is engaged by the drive sprocket 76. Perforations 77, such as depicted in FIG. 3, are engaged by sprocket teeth 79.

Figure 4:
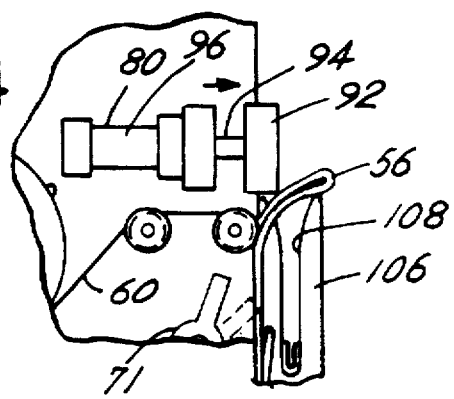
FIG. 4 is an enlarged elevation of the plunger mechanism adapted to position the loop end of a single loop from a tape for engagement by a loop transfer arm.

A plunger mechanism 80, as depicted in FIG. 2 and FIG. 4, includes a piston or head 92 mounted on a shaft 94. The shaft 94 is retained within a cylinder 96. Actuation of the cylinder 96 to move shaft or rod 94 will cause the head 92 to move as shown in FIG. 4 to engage the loop end 56 and bend the loop end 56 of loop 54 outwardly from the tape 60. When the loop end 56 bends outwardly, as depicted in FIG. 4, by operation of the plunger mechanism 80, the loop end 56 is then positioned for engagement by the loop transfer arm 82 as the loop transfer arm 82 moves in a generally circular path from its rest or start position.

Thus the loop transfer arm 82 is comprised of an arcuate blade 96 which has a bifurcated gripping end 98. The blade 96 is mounted on a radial support arm 100 which is, in turn, mounted on a rotary shaft 102. As the rotary shaft 102 rotates in the counter clockwise direction as shown in FIGS. 1 and 3, the bifurcated end 98 of the blade 82 sweeps in an arc and engages the loop end 56 that bends outwardly as shown in FIG. 4. In this manner, the loop end 56 is gripped and transported with the movement of the loop transfer arm 82 in the counter clockwise direction.

Figure 5:
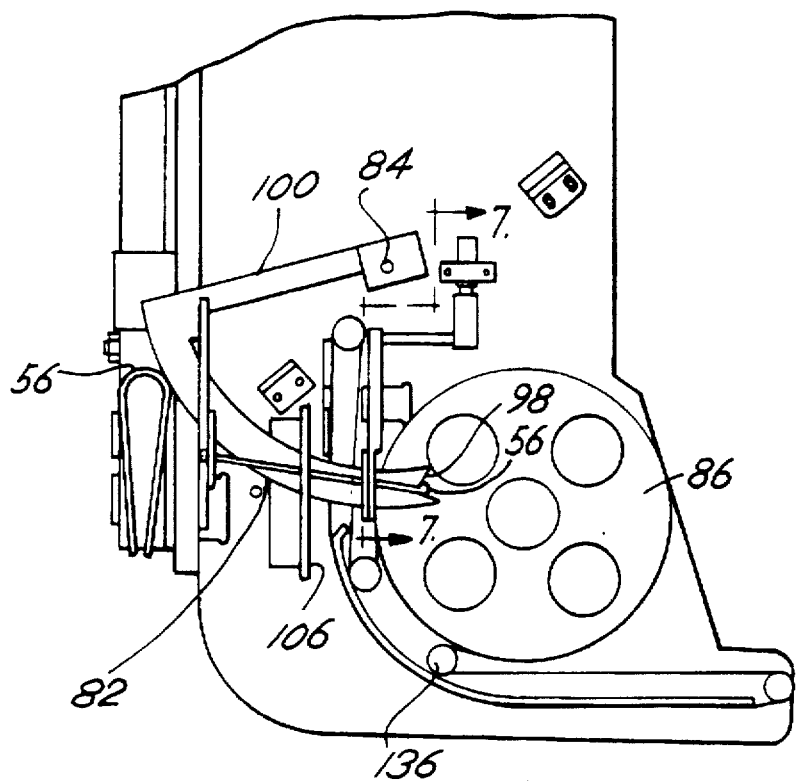
FIG. 5 is an elevation similar to FIG. 3 wherein the loop transfer arm has moved to effect transport of the loop from the tape.

A shutter 106 having a slot 108 is mounted on the framework so that as the loop 54, and more particularly the loop end 56, is engaged by the end 98, it is drawn through the slot 108 of shutter 106 thereby maintaining a longitudinal alignment of the loop 54 as it is transported in the manner depicted in FIG. 5. The mechanism also includes a second shutter 110 also having a slot 112 in FIG. 6 which is aligned generally with the slot 108 so that, as depicted in FIG. 6, the loop 54 is drawn through the slot 112 by the movement of the arm 82.

Figure 7:
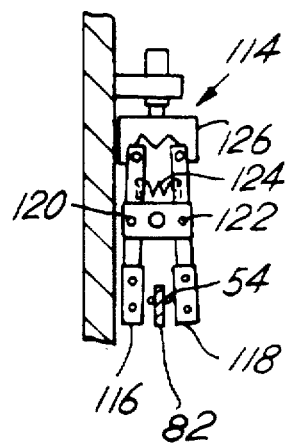
FIG. 7 is a cross sectional view of a mechanism for holding the end of the loop in position taken along the lines 7—7 in FIG. 6.
Figure 6:
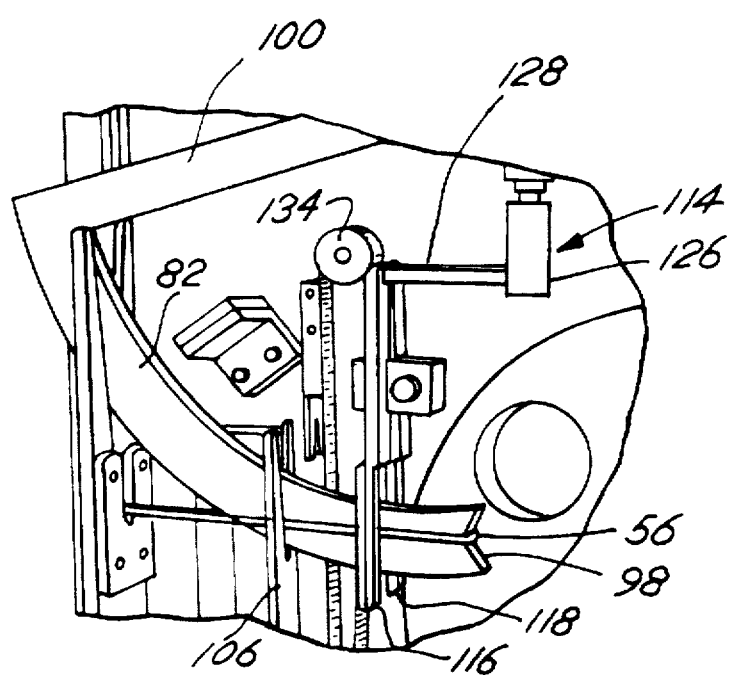
FIG. 6 is an enlarged perspective view of the component parts shown in FIG. 5.
Figure 8:
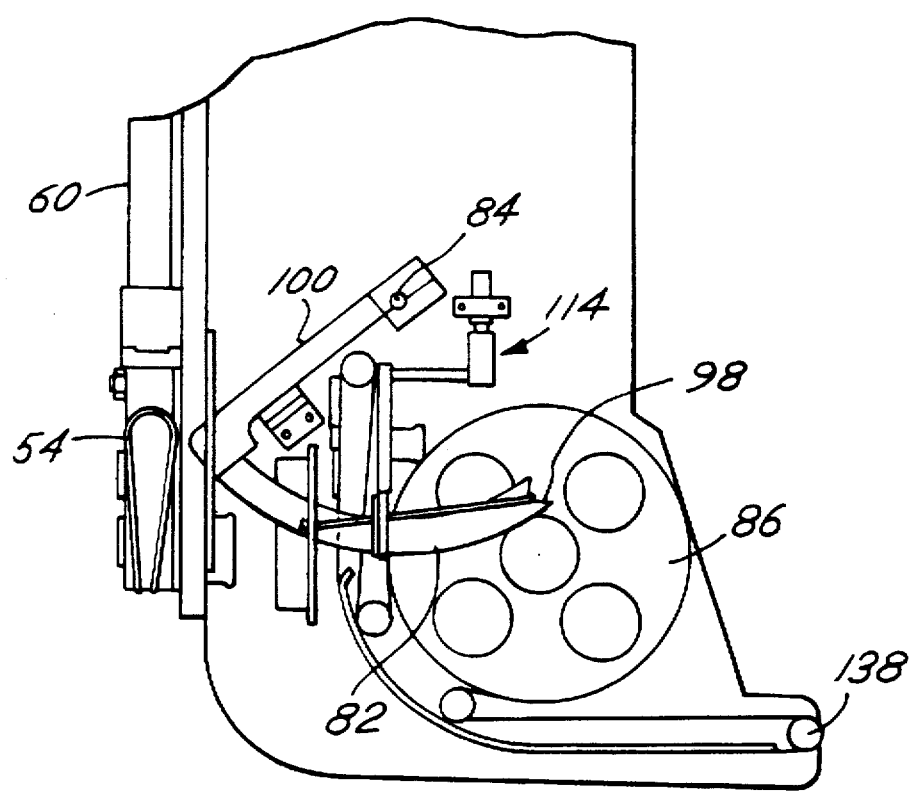
FIG. 8 depicts the construction of the loop feed mechanism upon further movement of the loop transfer arm from the position shown in FIG. 5.

The arm 82 continues in its counter clockwise path through arcuate movement depicted in FIG. 6 and then to the position depicted in FIG. 8. In moving along this path, the loop 54 is further transported through yet another shutter mechanism 114 depicted in FIG. 7. The shutter mechanism 114 includes spaced-apart shutter arms 116 and 118 which are pivoted about a pair of spaced pivot points 120 and 122. The arms 116 and 118 are biased by a spring 124 toward one another at their free distal ends as depicted in FIG. 7. A cam block 126 responsive to an actuating arm 128 driven by a rod and cylinder assembly 130 is positioned to counteract the biasing force of the spring 124 and cause the arms 116 and 118 to normally remain spaced apart until the transport arm 82 with the loop 54 affixed thereto moves between the arms 116 and 118. The cylinder assembly 130 then actuates the cam block 126 through the arm 128 to release the cam block 126 so that the spring 124 causes the arms 116 and 118 to approach one another and thereby grip the loop 54 against the sides of the blade 82. This is depicted in FIG. 8 and also in FIG. 9.

The movement of the arm 82 in its arcuate, counter clockwise pathway has thus caused the loop 54 to be drawn through the first shutter 106, into the second shutter 110 and a third shutter 114. The slot 112 of the shutter 110 is fabricated so that the tie-end 58 of loop 54 will be frictionally held in place while the loop end 56 is held against the sides of the blade 82 by the arms 116 and 118.

Figure 9:
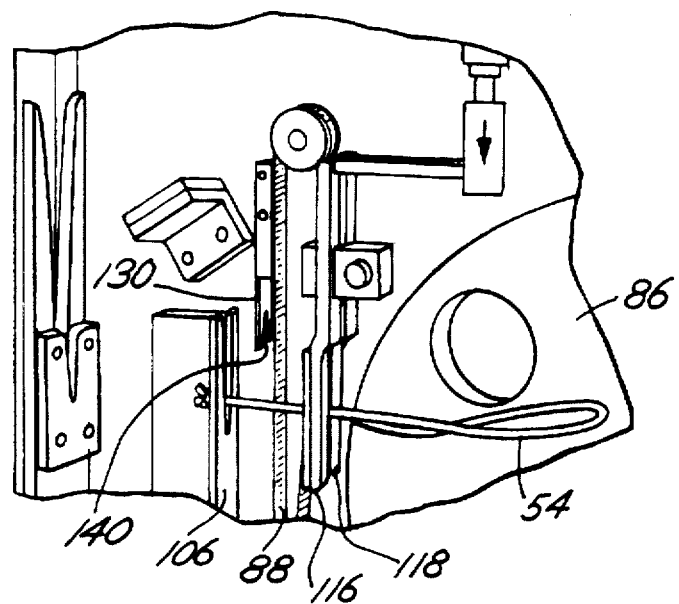
FIG. 9 depicts operation of the loop retention gripper upon removal of the loop transfer arm and initiation of the belt transfer of the loop.
Figure 10:
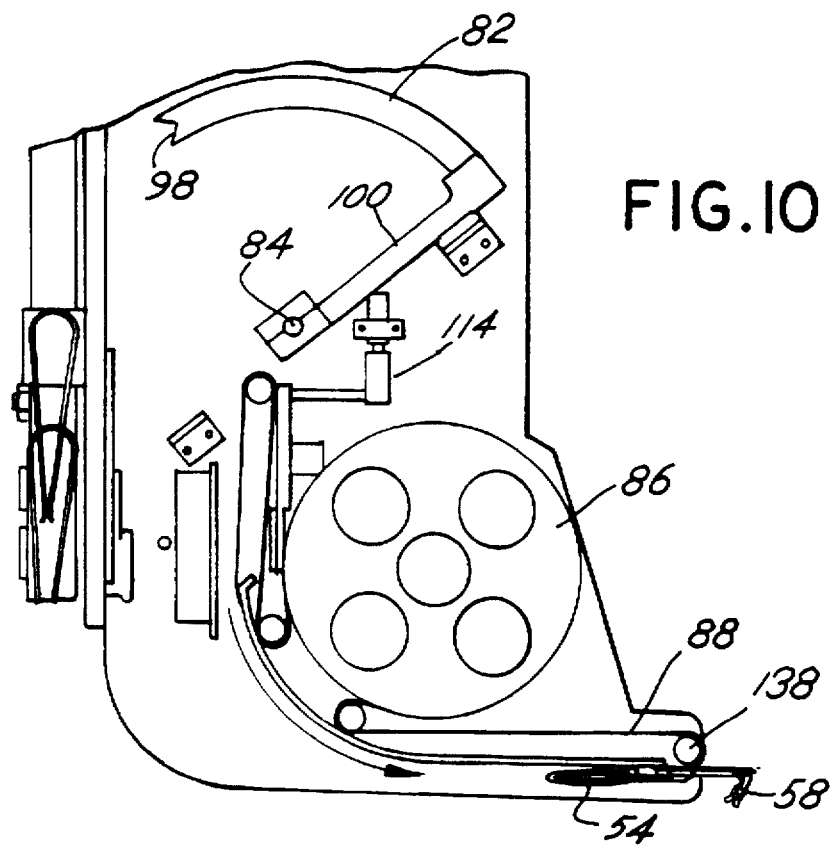
FIG. 10 illustrates the sequential operation for transport of the loop via the endless reciprocal belt toward and into the window in the frame of the clipper.

Subsequently, as depicted in FIG. 9, the endless belt 88 is driven. Belt 88 is moveable in response to the operation of the drive wheel 86 and includes a laterally projecting transfer bracket 130 thereon. Thus, as the belt 88 is moved, so does the transfer bracket 130 move. The drive wheel 86, therefore, commences motion in the clockwise direction as depicted in FIG. 9. This causes the endless belt 88, which is mounted on rollers 132, 134, 136 and 138, to move so that the bracket 130 will move downwardly as depicted in FIG. 9 to engage the loop 54 and more particularly a portion of the loop 54 adjacent the tie end 58. Thus the bracket 130 includes a slot 140 which fits over the loop 54. It then transports the loop 54 around or along a pathway defined by an arcuate guide plate 142. Thus, as depicted in FIG. 10, upon clockwise movement of the drive wheel 86, the belt 88 transports the loop 54, and more particularly the tie end 58 of the loop, toward the loop window 52 as the bracket 130 moves along the pathway defined by the plate 142.

Figure 11:
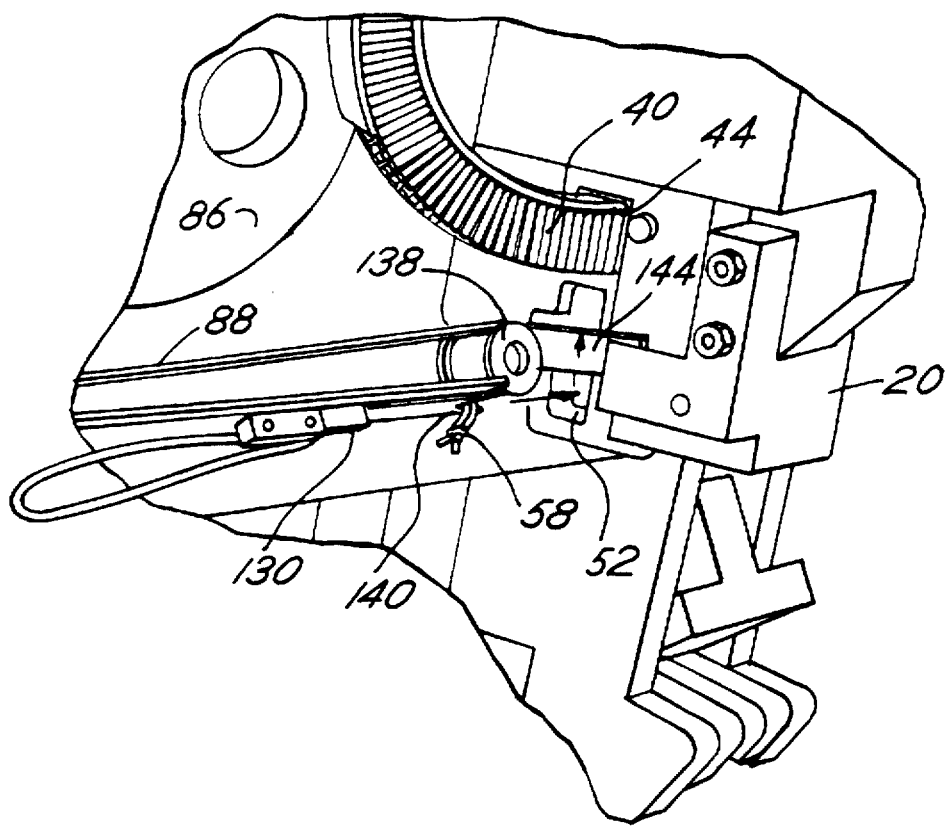
FIG. 11 discloses the loop window in the open position in the frame whereby the knotted end of a loop is positioned therethrough for engagement by a U-shaped metal clip.

Reviewing the sequence of operations, the arm or blade 82, transports the loop 54 from the position depicted in FIG. 3 to the position illustrated in FIGS. 5 and 6. Thereafter, the loop 54 is further transported to the position illustrated in FIG. 8. Then the blade or arm 82 is retracted and simultaneously the bracket or carrier member 130 transports the loop 54 as shown in FIGS. 9 and 10 to the position depicted in FIG. 11. Thus, the tie end 58 is positioned through the window 52.

Figure 12:
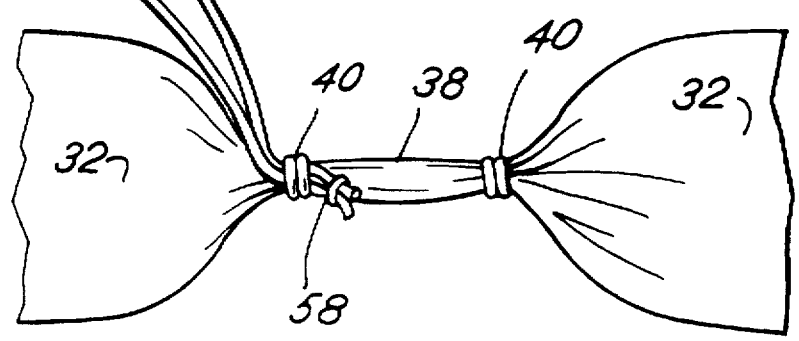
FIG. 12 is a perspective view of the loop as attached to gathered sausage casing by a U-shaped metal clip.

As the tie end 58 is positioned through the window 52 by means of movement of the bracket 130 on the belt 88, the tie end 58 will be retained in the window 52 by operation of a reciprocating plate or shutter 144. The plate 144 thus pivots to grip the tie end 58 in the window 52 so that when a clip 40 is moved downwardly in the channel within the clipper, the clip 40 will engage over the tie end 58. The shutter 144 is coordinated or timed to release the loop 54 as the clip 40 engages the loop 54. The loop 54 thus is transported and affixed about the casing 38 as depicted in FIG. 12 as the clip 40 is fastened about the casing 38. The tie end 58 of the loop is positioned on one side of the closed clip 40. The loop end 56 is on the opposite side. The loop end 56 may then be attached to a support. In operation, two clips 40 are attached simultaneously to the casing as described previously. Thus, a first clip 40 as depicted in FIG. 12 is arranged to fasten one loop 54. A second clip 40 ties off the opposite end of a chub 32.

Of course, the loop 54, after having been fed through the window 52 by the bracket 130, is released from the bracket 130 inasmuch as the drive wheel 86 is reversed in operation. This enables the carrier bracket 130 to be positioned in the position, for example, as shown in FIG. 6. The entire sequence of operations may then be again conducted.

It will be noted that this is an intermittent operation with the loops 54 being transported one at a time into the loop window 52 in coordination with attachment of clips about casing 38. Thus, the tape 60 operates intermittently as does the arm or blade 82 which reciprocates in an arcuate path as described, intermittently. Likewise, the drive wheels 86 operate intermittently to sequentially and intermittently position the tie end 58 of a loop 54 through the window 52 so that the clipper, which also operates intermittently, may attach a clip 40 in the manner described.

Alternative construction features of the invention may be used. For example, feed loops 54 from opposite sides into a double clipper using a mechanism as described may be used.

Alternative mechanisms for positioning a loop 54 in position with the carrier bracket 130 may be used. Therefore, the invention is to be limited only by the following claims and equivalents.

What is claimed is:

1. In a clip attachment apparatus of the type including a clipper having a frame with a clip channel that receives and guides movement of a U-shaped clip along a pathway through the channel toward gathered material at one end of the channel, said clip having a crown and depending spaced legs; a punch reciprocal in the channel; an anvil at the one end of the channel for forming the depending legs of a clip driven by the punch about gathered material; a clip window in the frame that receives and guides movement of a clip therethrough into the channel; a clip feed mechanism for feeding clips through the clip window into the channel; the improvement of a mechanism for feeding a flexible cord loop into the pathway of a U-shaped clip moving in said clip channel toward said anvil, said loop formed from a flexible cord and mounted on a tape supported by the frame, said loop having a loop end and a tie end, said tie end releasably affixed to the tape, said mechanism adapted for feeding the tie end into said clip channel pathway whereby the crown of the clip engages the tie end against gathered material, said mechanism for feeding comprising, in combination:

(a) a tape feed device including a storage roll for a tape with a series of loops mounted thereon, a plurality of rollers for guiding the tape with the loop end positioned for movement in the direction of tape movement, one of the rollers defining an angular change of direction of the tape;

(b) a plunger on the frame for engaging the loop end and diverting the loop end from the tape upon the angular change of direction;

(c) a loop transfer arm reciprocally mounted for movement between a loop end engaging position and a loop removal position, said transfer arm including an active end for engaging the loop end and moving the loop end through an alignment slot as the tie end of the loop is released from the tape;

(d) a transfer tie end gripping arm support belt, said belt mounted for reciprocal movement on a drive wheel and idler rollers;

(e) a tie end gripping arm extending laterally from said reciprocating belt and moveable by means of said belt between a position for engaging the tie end of the loop and a position for positioning the tie end in the pathway of a clip in the channel; and (f) a loop window leading to the clip channel, said gripping arm effective by movement with the belt to position the tie end in the clip channel pathway.

2. The mechanism of claim 1 including means for retaining the tie end in the loop window projecting into the channel.

3. The mechanism of claim 1 wherein said reciprocating belt is an endless belt, and said endless belt reciprocates to alternately feed a loop into the loop window and then return to said tie end engaging position for feeding a subsequent loop into the loop window.

4. The mechanism of claim 1 wherein the loop transfer arm is bifurcated to fit through the loop end of the loop and thereby engage and move the loop.

* * * * *